UNITED STATES PATENT OFFICE.

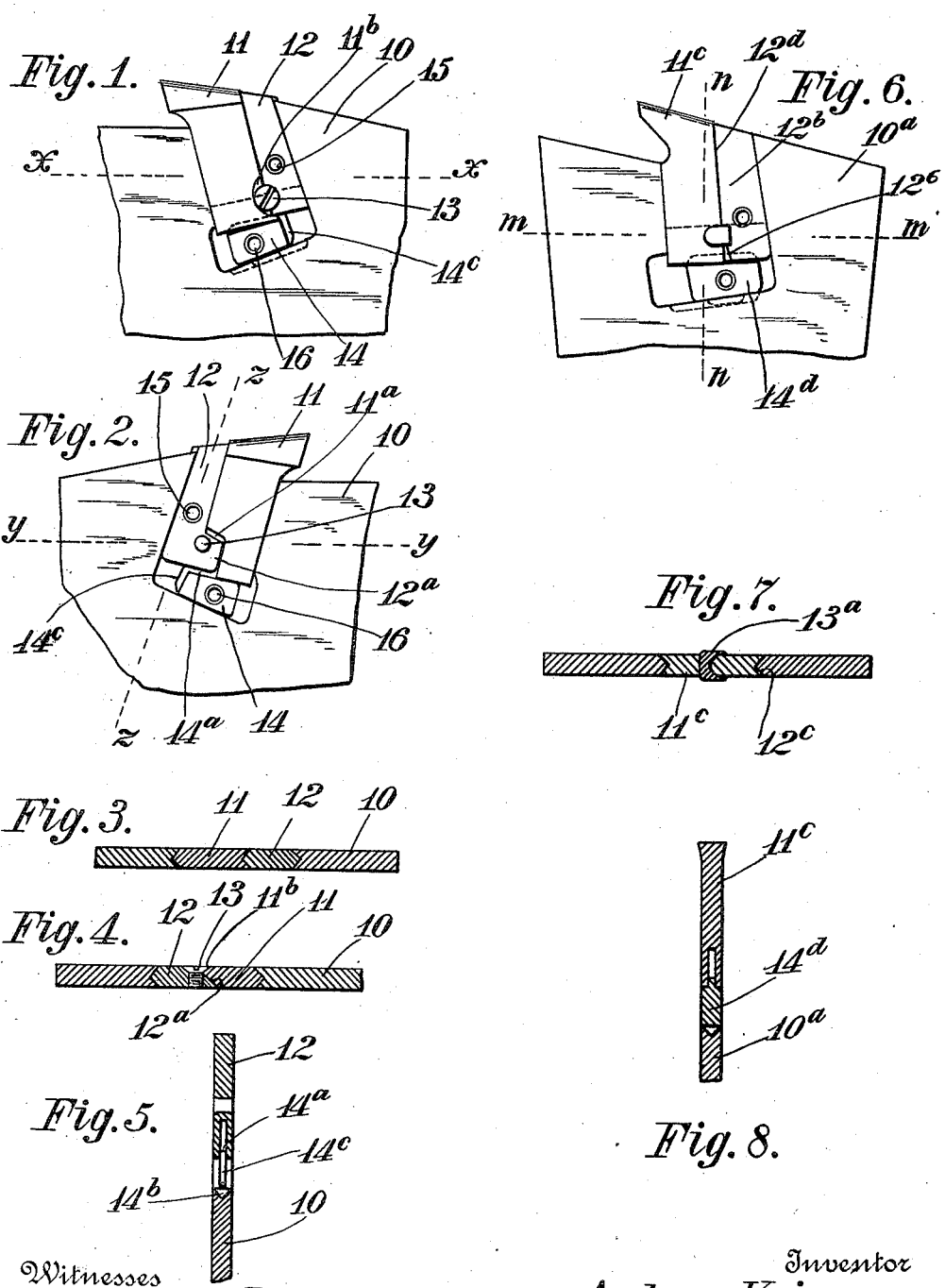

ANDREW KRIEGER, OF COLUMBUS, OHIO.

DETACHABLE SAW-TOOTH.

1,078,734.  Specification of Letters Patent.  Patented Nov. 18, 1913.

Application filed April 11, 1913.  Serial No. 760,435.

*To all whom it may concern:*

Be it known that I, ANDREW KRIEGER, a citizen of the United States, residing at Columbus, in the county of Franklin and State of Ohio, have invented a certain new and useful Improvement in Detachable Saw-Teeth, of which the following is a specification.

The object of this invention is to provide an improved adjusting device for an inserted saw tooth.

My invention herein is shown as used in connection with the saw teeth illustrated in my Letters Patents of the United States, Nos. 1,048,181 and 1,048,182, dated December 24, 1912.

The invention is embodied in the construction herein shown and described, the features of novelty being pointed out in the claims appended to the description.

In the accompanying drawing—Figure 1 is a side elevation of a fraction of a saw body showing a tooth and means for securing the same as shown in my Patent No. 1,048,181, above referred to with the adjusting device of the present invention added thereto. Fig. 2 is a similar elevation of the side opposite that shown in Fig. 1. Fig. 3 is a section on the line $x$—$x$ Fig. 1. Fig. 4 is a section on the line $y$—$y$ Fig. 2. Fig. 5 is a section on the line $z$—$z$ Fig. 2. Fig. 6 is a side elevation of a fraction of a saw body showing a tooth and means for securing the same as shown in my Patent No. 1,048,182 above referred to with an adjusting device according to the present invention added thereto. Fig. 7 is a section on the line $m$—$m$ Fig. 6. Fig. 8 is a section on the line $n$—$n$ Fig. 6.

Referring first to Figs. 1 to 5, inclusive, 10 designates the saw body which is provided with a recess to receive the tooth and the securing and adjusting devices, said recess having tongued edges inclined toward each other as they approach the edge of the saw body. 11 designates the tooth which has a shank with grooved parallel edges. The grooved edge at the back of the tooth fits upon the tongued side of the recess, as shown in said views so as to leave a tapering space between the forward edge of the tooth and to leave a tapering recess for the tapering wedge 12. The wedge 12 is shown as made shorter than the depth of the recess in the saw body so that the wedge can be moved outward to tighten the tooth or inward to release that member. The base or inner end of the shank of the tooth, at its forward edge and at one side is provided with a curved beveled portion 11$^b$. The inner end of the wedge 12 is made with a beveled rearwardly projecting tongue 12$^a$ that rests against the beveled portion 11$^a$. The beveled portion 11$^a$ is made extensive enough longitudinally to permit the wedge to be moved inward or outward. 13 designates a screw threaded into the wedge at a point adapted to have its head bear upon the curved beveled portion 11$^b$ of the tooth. Because said screw is adjustable it can be turned to cause its head to bear upon any point of the beveled portion 11$^b$ opposite to which it can be moved in the normal adjustment of the wedge for tightening or securing the tooth, all as in said patent. In the present instance the recess is made deeper than shown in my said patent to receive the adjusting wedge 14 of the present invention. This wedge is shown as made with a tongue 14$^a$ on its upper edge that extends around on the narrow end of the wedge, as seen at 14$^c$, while the lower edge of the wedge is provided with a tongue 14$^b$. The tongue on the upper edge is engaged by corresponding grooves in the lower ends of the shank of the tooth 11 and wedge 12 while the tongue on the lower edge of the adjusting wedge 14 enters a groove in the bottom of the recess. The wedge 14 is made short enough and narrow enough so that when placed at the wider end of its space below the tooth and wedge 12 it lies under the shank of the tooth and leaves room for the depression of the wedge 12 to permit the separation and removal of the parts. In practice the tooth is first adjusted and fixed by the wedge 12 and then the wedge 14 is pressed toward the narrow end of the opening as far as it can be driven by the application of reasonable pressure and then the screw 13 is tightened. This tightening of the screw clamps the metal of the shank of the tooth and also the metal of the wedge 12 upon the tongue 14$^a$, thereby locking all three parts in place. 15 is a hole in the wedge 12 for inserting a tool to press the wedge 12 in or out and 16 is a similar hole in the wedge 14 for shoving that member in one direction or the other. It is obvious that the position of the wedge 14 in its space is determined by the extent of the proper projection of the saw tooth so that if the tooth be short or becomes worn the said wedge will occupy a position nearer the narrower end of the space in which it is located and conversely if the tooth be long.

Referring now to Figs. 6 to 8, inclusive, 10$^a$ designates the saw body which has a tooth and wedge receiving recess having sides inclined toward each other as they approach the edge of the saw body. 11$^c$ designates the tooth, the shank of which has grooved parallel edges, and 12$^b$ the parallel wedge. This wedge 12$^b$ has one grooved straight edge 12$^c$ to fit on the tongue of one side of the recess while the other edge is tongued and doubly inclined as seen at 12$^d$ and 12$^e$ so that the wedge tapers toward each end. The wedge 12$^b$ is made of such dimensions that one of its tapered ends closes a portion of the space between the shank of the tooth and the edge forming one side of the recess in the saw body while the other end leaves an angular space between it and the lower end of the shank and the wedge. Formed permanently with the shank of the saw tooth is a V-shaped tongue or lock 13$^a$ that is of softer metal than the tooth and can be pressed into the angular space between the wedge and shank after the wedge has been forced outward into position to firmly hold the tooth in position. When the soft metal lock has been pressed into place, as best shown in Fig. 7, neither the tooth nor the wedge can be moved in any direction with reference to each other or to the saw body except by forcibly dislodging the wedge. When the wedge is driven inward the tongue thereof merely spreads the parts of the soft metal lock without destroying it and ordinarily leaving it in condition for further use in the same way. In inserting a tooth in this form the wedge 12$^b$ is first placed in the recess with its straight edge against the side of the recess. This leaves room for the insertion of the shank of the tooth. After this the wedge is forced outward until the tooth is tightly in position. In this instance also the recess in the saw body is made wider than shown in the corresponding patent to receive the adjusting wedge 14$^d$. This wedge 14$^d$ is made with a tongue on its upper and lower edges substantially as in the instance first herein described to enter corresponding grooves in the tooth and the parallel wedge. This wedge is also made short enough and narrow enough so that when placed in the wider end of the space below the tooth and parallel wedge it lies under the shank of the tooth and leaves room for the depression of the said parallel wedge and the separation and removal of the parts. In practice the tooth is first adjusted and fixed by the parallel wedge and then the wedge 14$^d$ is pressed toward the narrow end of the space it occupies as far as it can be driven by the application of reasonable pressure and then the ends of the tongue or lock 13$^a$ pressed inward so as to clamp the metal of the grooved ends of the shank of the tooth on the parallel wedge and also the metal of said shank or wedge or both against the tongue of the adjusting wedge. As in the instance first herein described it is obvious that the position of the wedge in its space is determined by the extent of the proper projection of the saw tooth so that if the tooth be short or becomes worn the transversely movable wedge 14$^d$ will occupy a positon nearer the narrower end of the space in which it is located or conversely if the tooth be long.

What I claim is—

1. In combination with a recessed saw body, a tooth having a shank constructed to engage one edge of said recess, means for securing said tooth in position circumferentially with reference to the saw body and a wedging device in said recess movable circumferentially with reference to the saw body and engaged with said shank to fix the tooth in any position within limits radially with reference to the saw body.

2. In combination with a recessed saw body, a tooth having a shank constructed to engage one edge of said recess, means for securing said tooth in position circumferentially with reference to the saw body, a wedging device in said recess transversely movable with reference to and engaged with said shank to fix the position of the tooth radially with reference to the saw body, and means to press the metal of the tooth against the metal of the transversely movable wedge.

3. In combination with a recessed saw body, a tooth having a shank constructed to engage one edge of said recess, and a parallel wedge engaging the shank of the tooth and the opposite edge of said recess, a wedging device in said recess transversely movable with reference to and engaged with said shank and its parallel wedging device, and means for securing said three parts in fixed relation to each other.

ANDREW KRIEGER.

Witnesses:
 BENJAMIN FINCKEL,
 GEORGE M. FINCKEL.

---

Copies of this patent may be obtained for five cents each, by addressing the "Commissioner of Patents, Washington, D. C."